April 30, 1968        A. G. STANSBY        3,381,277
SYSTEM FOR SELECTIVE READOUT OF AN INFORMATION STORE
Filed Oct. 11, 1965        2 Sheets-Sheet 2
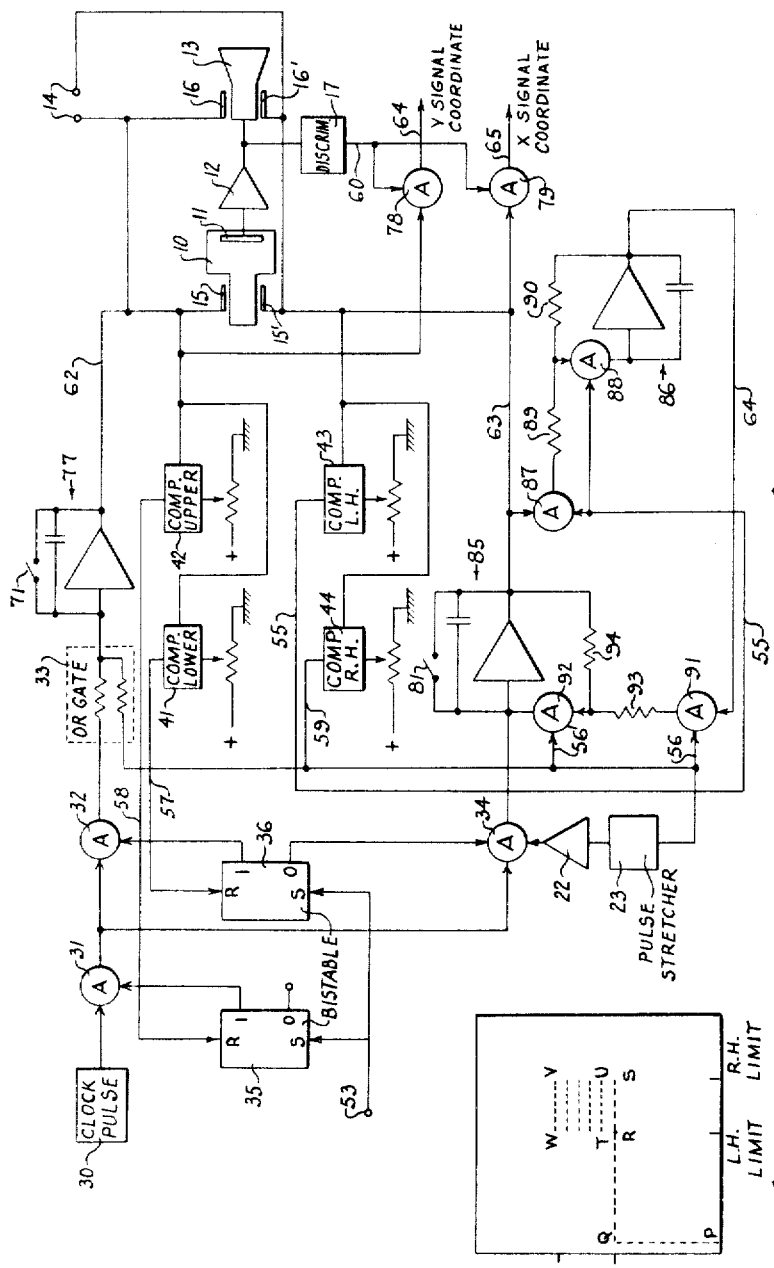
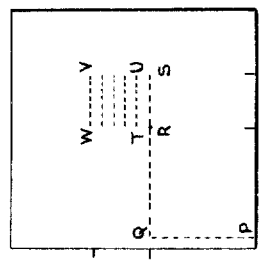
INVENTOR
Anthony G. Stansby
BY Harold E. Weir
PATENT AGENT

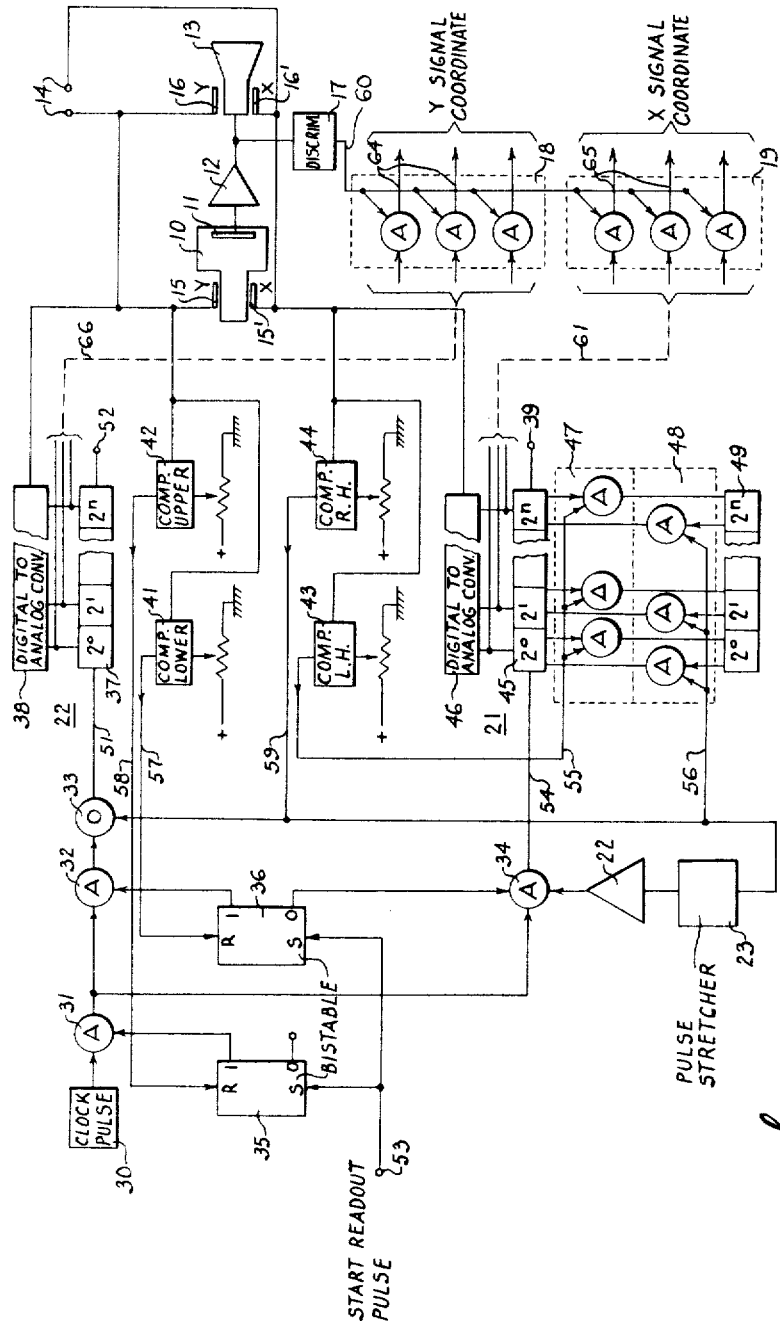

United States Patent Office 3,381,277
Patented Apr. 30, 1968

3,381,277
SYSTEM FOR SELECTIVE READOUT OF AN INFORMATION STORE
Anthony G. Stansby, Ontario, Canada, assignor to Northern Electric Company Limited, Montreal, Quebec, Canada
Filed Oct. 11, 1965, Ser. No. 494,594
8 Claims. (Cl. 340—172.5)

ABSTRACT OF THE DISCLOSURE

A system for monitoring a selected portion of a data store and supplying the coordinates of signals stored in this selected portion having magnitudes exceeding a predetermined value. The selected portion is scanned under the control of two scanning generators. Gating circuits connected to the scanning generator outputs are activated when a signal exceeding the predetermined magnitude is detected to supply coordinate representing signals to output terminals. A digital and an analog embodiment are described.

---

This invention relates to a system for reading out the data contained in a designated part of an information store and establishing the coordinates or address of such parts of the sensed data which have a predetermined characteristic.

It is common, when using information stores, to place data in predetermined locations, known as addresses. By returning to such locations at some future time the stored data can be retrieved. A known form of information store is a cathode ray storage tube. This consists of a cathode ray tube in which the electron beam impinges on a target surface of insulating material. Data is stored on this target in the form of a varying charge distribution. The data is retrieved by monitoring the beam current as the electron beam scans over the charge distribution, the changes in beam current being related to the charge distribution.

It is known to use a cathode ray storage tube in conjunction with an information processing system by storing data at a predetermined location on the target. When the information stored at this location is required the deflection of the electron beam is controlled so that it is deflected to this location.

A different aspect of information storage arises in the processing of information obtained from such sources of information as radar apparatus. Such information is frequently stored in cathode ray storage tubes with the position of an individual signal corresponding to the time when it was received. It will be clear that the location or address of the signal is not known. The address in this instance is the information of interest since it represents the spatial coordinates of a reflecting object.

A known method for obtaining the coordinates of a radar signal is to display the information from the storage tube on the screen of a cathode ray tube. An operator can then view the display of all the reflected signals and position a calibrated mechanical marker over the particular signal whose coordinates are required. The desired coordinates are then read off from the marker. Alternatively the operator may control the position of an electronic marker which produces a brightened spot on the screen of the display tube. By superimposing the marker on the signal of interest the coordinates of the signal may be obtained from the calibrated marker control. It will be observed that the success of these methods depends on the continual accuracy and vigilance of the operator.

Presently available information processing systems can be used to examine the returned radar signals and automatically determine the coordinates of all signals having a predetermined form and amplitude. There are two disadvantages, however, to such an automatic determination of signal location. The first is that the complexity and consequent expense of the information processing system may not be justified. The second, more serious, disadvantage is that such a system fails to use the pattern recognition abilities of a human operator. While a human operator is inferior to an information processing system in exact measurements, such as the determination of signal coordinates, such an operator is superior in assimilating and evaluating the overall pattern of radar returns.

It is clearly desirable to use both the operator and the information processing system to perform the functions of which each is uniquely suited. That is the operator should be used to determine which of the radar returned signals is of primary interest and to direct the information processing system to this signal so that it may determine the exact coordinates of the signal of interest.

It is, therefore, an object of this invention to provide a system for scanning a designated portion of a cathode ray tube target.

It is a further object of this invention to provide a system for accurately specifying the coordinates of signals stored in a designated portion of a cathode ray tube target.

In the system of this invention a selective readout is made of part of the data stored on the target of a cathode ray storage tube. The system is arranged so that the operator views a complete display of all the returned radar signals and, having selected the signal of primary interest, designates part of the display area, containing this signal, to be scanned in detail. This designated portion of the total display area is then scanned and when a returned radar signal exceeding a predetermined amplitude is detected, an output signal is produced representing the exact coordinates of the detected radar return. This output signal may be in a form suitable for immediate use by any further information processing system.

Further features and objects of this invention will become apparent from the following description taken in conjunction with the accompanying drawings, in which:

FIGURE 1 is a schematic diagram of one embodiment of this invention in which the output information is a binary coded signal, FIGURE 2 is a schematic diagram of a second embodiment of this invention in which the output information is an analog signal, and FIGURE 3 is a diagram of the path followed by the scanning beam of a storage tube in the system of this invention.

Referring now to FIGURE 1, there is shown one embodiment of the system of this invention. A cathode ray storage tube 10 having a target 11 has information stored on this target from a source of signals, such as a radar system, which is not shown. The information stored in storage tube 11 is periodically read out, amplified in an amplifier 12 and displayed on a conventional cathode ray tube 13. The scanning voltages for this complete readout are of conventional form and are supplied through terminals 14 to the deflection means 15, 15' and 16, 16' of cathode ray tubes 10 and 13 respectively. Thus by viewing the display on cathode ray tube 13 an operator can determine which signals are of primary importance and set the system of FIGURE 1 to scan only that area of target 11 containing such signals.

The system for controlling the partial scan of the electron beam or sensing means of storage tube 10 consists of an X-scan generator indicated generally at 21 and a Y-scan generator indicated generally at 22. Both the X-scan and Y-scan generators are controlled from a source of clock pulses 30 coupled to the scan generators through logical circuitry. The resulting scan of the storage tube 10 and display tube 13 follows the pattern shown in FIGURE 3. That is, the electron beam traces out the path PQR and then scans the area RSVW in detail. The limits of the detailed scan, RSVW are determined by the adjustable settings on four voltage comparators, 41, 42, 43 and 44. When the storage tube scan passes over a location at which is stored a signal having a magnitude greater than a predetermined value, two multiple AND gates 18 and 19 are enabled to supply a signal from the X-scan and Y-scan generators representing the exact location of the detected signal.

Considering now, in greater detail, the system shown in FIGURE 1, the Y-scan generator 22 consists of a binary counter 37 and a digital to analog converter 38. Counter 37 is a conventional binary counter increasing its count by one for each pulse it receives on input conductor 51. The reset terminal of the counter is designated by reference numeral 52. The counter 37 has a parallel connection to digital to analog converter 38 which is also conventional and provides a continuous output voltage proportional to the count stored in counter 37.

The source of clock pulses 30 is connected to the input of binary counter 37 through a series path formed by an AND gate 31, and AND gate 32, and an OR gate 33. Two bistable circuits 35 and 36 are provided to control the flow of clock pulses through these gates. The SET inputs of both bistable circuits are connected to a terminal 53 adapted to receive the starting pulse for the readout. The 1 output terminal of bistable circuit 35, that is the terminal which is energized when the bistable circuit is in the SET condition, is connected to AND gate 31. The 1 output terminal of bistable circuit 36 is connected to AND gate 32. Thus when both bistable circuits are in the SET condition clock pulses are coupled from the source 30 through AND gates 31 and 32 and OR gate 33 to the binary counter 37.

The X-scan generator 21 is similar to the Y-scan generator and consists of a binary counter 45 coupled to a digital to analog converter 46. Input pulses to counter 45 are supplied on conductor 54, the counter can be reset by a pulse applied to terminal 39.

A further AND gate 34 is provided between the output of AND gate 31 and binary counter 45. One input of AND gate 31 is connected to the 0 output terminal of bistable circuit 36, that is the terminal which is energized when the bistable circuit is in the RESET condition. A further input of AND gate 34 is connected to the output of an inverting amplifier 22. The output from amplifier 22 is normally energized, its function will be described more fully below. Thus, when bistable circuit 35 is in the SET condition and bistable circuit 36 is in the RESET condition clock pulses are coupled from the source 30 through AND gates 31 and 34 to binary counter 45.

The output from digital to analog converter 38 is connected to the Y deflection plates of storage tube 10 and display tube 13 and the output from digital to analog converter 46 is connected to the X deflection plates of storage tube 10 and display tube 13. Thus it will be seen that the voltages at the outputs of digital to analog converters 38 and 46 are connected in parallel with the respective scanning voltages for the complete readout supplied through terminals 14. When no scanning voltages are being supplied through terminals 14 then the Y deflection of the electron beam of both the storage and display tubes is proportional to the number stored in binary counter 37 and the X deflection of both tubes is proportional to the number stored in binary counter 45.

A binary storage register 49 is provided to store the number present in binary counter 45 at any selected time. Each bistable section of counter 45 is connected through an AND gate to a corresponding bistable section of storage register 49. These gates together form a multiple AND gate 47 enabled by a pulse on conductor 55 which is common to all the individual AND gates. When conductor 55 is energized the number present in counter 45 is stored in storage register 49.

In order to be able to set the counter 45 to the number stored in register 49 a further multiple AND gate 48 is provided. Each bistable section of register 49 is connected through an individual AND gate of this multiple gate to the corresponding bistable section of counter 45. Multiple AND gate 48 is enabled by energizing conductor 56 which is common to the individual AND gates. Thus when conductor 56 is energized counter 45 is set to the number stored in register 49. Since the number present in counter 45 corresponds to a particular value of X deflection it will be seen that information as to this deflection can be stored in register 49 and at some subsequent time the beam can be restored to this deflection by opening gate 48.

To establish the limits of the detailed scan RSVW, shown in FIGURE 3, four voltage comparators 41, 42, 43 and 44 are used. These comparators are of conventional design and produce an output pulse whenever there is equality between the voltages appearing at the comparator's two inputs. One input of each comparator is connected to an individual source of variable voltage schematically indicated by a potentiometer. The second inputs of comparators 41 and 42 are connected in parallel to the Y-scan voltage appearing at the output of digital to analog converter 38. The second inputs of comparators 43 and 44 are connected in parallel to the X-scan voltage appearing at the output of digital to analog converter 46.

The output of comparator 41 is connected via conductor 57 to the RESET input of bistable circuit 36. The output of comparator 42 is connected via conductor 58 to the RESET input of bistable circuit 35. The output of comparator 43 is connected to conductor 55 which enables multiple AND gate 47. The output of comparator 44 is connected via conductor 59 to a pulse stretching circuit 23, to one input of OR gate 33 and to conductor 56 which enables multiple AND gate 48.

The operation of that portion of the system of FIGURE 1 so far described will now be discussed with reference to the detailed scan shown in FIGURE 3. Consider that initially both bistable circuits 35 and 36 are in their RESET condition and any arbitrary count is stored in binary counters 37 and 45, resulting in the electron beam of the storage tube having a corresponding arbitrary deflection. The variable voltage sources controlling the comparators are manually adjusted so that comparator 41 triggers at a Y-scan voltage corresponding to the point Q; comparator 42 triggers at a Y-scan voltage corresponding to a point slightly higher than W; comparator 43 triggers at an X-scan voltage corresponding to the point R and comparator 44 triggers at an X-scan voltage corresponding to the point S.

To start the detailed scan a pulse is applied to terminals 53, 52 and 39. These terminals would normally be connected together, for clarity of drawing this connection has not been shown. This pulse results in binary counters 37 and 45 being reset and the X-scan and Y-scan voltages altering to deflect the electron beam to point P. The application of the pulse to terminal 53 changes the state of bistable circuits 35 and 36 to the SET condition. This results in AND gates 31 and 32 being opened to permit clock pulses from source 30 to be fed to the input of binary counter 37. As the total count in binary counter 37 increases a corresponding increase takes place in the Y-scan voltage at the output of digital to analog converter 38 and the electron beam is deflected from P to Q.

When the Y-scan-voltage reaches a value corresponding to the point Q comparator 41 triggers and emits a pulse which changes the state of bistable circuit 36 to the RESET condition. This results in AND gate 32 being closed and AND gate 34 being opened, thus supplying clock pulses to counter 45 instead of counter 37. As the total count in binary counter 45 increases the electron beam is deflected along the path QRS. When the X-scan voltage corresponds to the point R comparator 43 is triggered and emits a pulse which opens multiple AND gate 47. This transfers to storage register 49 the number corresponding to the X deflection of R.

The X-scan voltage continues to deflect the electron beam until it reaches the point S when comparator 44 triggers and emits a pulse which performs three separate functions. This pulse, when applied to pulse stretching circuit 23 followed by inverting amplifier 22, cuts off AND gate 34 to ensure that no clock pulses are fed to binary counter 45 during the retrace action.

The second function performed by the pulse from computor 44, when fed through OR gate 33 is to add one to the total in binary counter 37. This results in the Y-scan voltage being increased to correspond to the line TU. The remaining function performed by the pulse is to open multiple AND gate 48 to set counter 45 to the number corresponding to the X deflection of R. It will be remembered that this number was previously stored in binary storage register 49. Accordingly after reaching the point S the beam follows a retrace path to reach the point T. When the stretched pulse from circuit 22 terminates AND gate 34 is opened and clock pulses are once again supplied to counter 45.

The system continues to scan the area RSVW in the fashion described until the point V is reached. The comparator 44 triggers and increases the count in binary counter 37 by one, as previously described. The resulting increase in Y-scan voltage triggers comparator 42 which emits a pulse, changing bistable circuit 35 to the RESET condition. This removes the enabling voltage from AND gate 31 and cuts off the supply of clock pulses to the system. Consequently the detailed scan ceases.

During the scanning of the storage tube, signals are fed from target 11 through amplifier 12 to display tube 13. These signals are also fed to an amplitude discriminator 17 which produces a pulse on output conductor 60 whenever the magnitude of the input signal exceeds a predetermined value. The threshold of discriminator 17 can be varied by the operator. A multiple AND gate 18 has one input of each individual AND gate connected in common to conductor 60. The second input of each individual AND gate is connected to a bistable section of binary counter 37 by multiple conductor 66, there being a one to one correspondence between AND gates and bistable sections.

When amplitude discriminator 17 produces an output pulse multiple AND gate 18 is opened and its output conductors carry a signal representative of the total stored in binary counter 37. Thus the exact Y coordinate of the signal which triggers discriminator 17 is represented by the output of multiple AND gate 18.

A multiple AND gate 19 is provided to perform an analogous function in obtaining the exact X coordinate of the detected signal. Each individual AND gate in multiple gate 19 has one input connected in common to conductor 60. The second input of each individual AND gate is connected to a bistable section of binary counter 45 by multiple conductor 61, there being a one to one correspondence between the individual AND gates and the bistable sections. Thus the exact X coordinate of the signal which triggers discriminator 17 is represented by the output of multiple AND gate 19.

The output signal from multiple AND gates 18 and 19 is in a form suitable for immediate use by any following data processing system.

During that part of the detailed scan when the electron beam follows a retrace path from S to T it may happen that when the trace reaches T comparator 43 will be again triggered. This does not, however, affect the operation of the system since at such a time the same number is stored in both binary counter 45 and storage register 49.

Another embodiment of the scanning system of this invention is shown in FIGURE 2. In this embodiment the system of gates and bistable circuits which control the application of clock pulses to the X-scan and Y-scan generators is identical to that already described in connection with FIGURE 1. Such description will not be repeated. Further the arrangement of cathode ray storage tube 10, display tube 13 and voltage comparators 41 to 44 inclusive is identical to that already described.

In the embodiment of FIGURE 2 the Y-scan generator is formed by a conventional feedback integrator circuit 77. Thus for a series of clock pulses applied to integrator 77 the output voltage is a staircase waveform increasing by one step for each input clock pulse. Provision is made for resetting integrator circuit to its initial value; this is indicated schematically by switch 71.

The X-scan generator is formed by another feedback integrator circuit 85. Switch 81 schematically indicates means for resetting this circuit to its initial value. Provision is also made for storing the value of the X-scan voltage at any particular instant and subsequently setting the X-scan generator to this stored value. The X-scan store is formed by a feedback integrator circuit 86. The means for storing the voltage appearing at the output of integrator 85 in integrator 86 consists of two AND gates 87 and 88 together with two resistors 89 and 90. One input to each AND gate is connected to conductor 55. When conductor 55 is energized AND gates 87 and 88 are opened and integrating circuit 86 is modified by the presence of resistors 89 and 90 to act as a phase inverting operational amplifier. The negative value of the voltage appearing on conductor 63 is then stored on the integrating capacitor of circuit 86. This method of setting integrator circuits to desired voltages is discussed more fully in the textbook "Electronic Analog and Hybrid Computers," Korn et al., McGraw-Hill, 1964.

Integrator circuit 85 is also modified by the provision of AND gates 91 and 92 and resistors 93 and 94. One input of each of AND gates 91 and 92 is connected via conductors 56 and 56', respectively to conductor 59. When conductor 59 is energized, AND gates 91 and 92 are opened and integrating circuit 85 is modified by the presence of resistors 93 and 94 to function as a phase inverting amplifier. The negative value of the voltage appearing on conductor 64 is then stored on the integrating capacitor of circuit 85.

Thus it can be seen that the value of the X-scan voltage at any instant can be stored in circuit 86 by energizing conductor 55 to open AND gates 87 and 88. Further the X-scan generator 85 can be set to the X-scan voltage stored in circuit 86 by energizing conductor 59 to open AND gates 91 and 92.

The operation of the system of FIGURE 2 is very similar to the operation of the system of FIGURE 1. Again consider that initially both bistable circuits 35 and 36 are in the RESET condition and any arbitrary voltage is stored in integrating circuits 77 and 85 resulting in the electron beam of the storage tube having an arbitrary deflection. The variable voltage sources controlling the comparators 41 to 44 inclusive are adjusted to define the detailed scan area RSVW shown in FIGURE 3.

To start the detailed scan a pulse is applied to terminal 53 and integrating circuits 77 and 85 are reset by the actuation of switches 71 and 81. The application of the pulse to terminal 53 changes bistable circuits 35 and 36 to the SET condition and hence opens AND gates 31 and 32 to supply clock pulses to integrating circuit 77. As the voltage on conductor 62, at the output of integrating circuit 77, increases the electron beam is deflected from P to Q.

When the Y-scan voltage reaches the value corresponding to the point Q comparator 41 triggers and resets bistable circuit 36. This switches clock pulses to the input of integrating circuit 85 and, as the voltage on conductor 63 increases, the electron beam follows the path QRS. When the X-scan voltage corresponds to the point R comparator 43 is triggered and opens AND gates 87 and 88 to store the R deflection voltage in X-scan store 86.

When the X-scan voltage corresponds to the point S comparator 44 is triggered and emits a pulse on conductor 59 to perform three separate functions. This pulse is applied to pulse stretching circuit 23 to cut off AND gate 34 during the retrace of the electron beam. The pulse also opens AND gates 91 and 92 to set into integrating circuit 85 the value of X-scan deflection (corresponding to R) stored in X-scan store 86. The remaining function performed by the pulse is to increase the Y-scan deflection by one step when fed to integrating circuit 77 through OR gate 33. Accordingly after reaching point S the beam is retraced to T. When the stretched pulse, provided by circuit 23, terminates AND gate 34 is opened and clock pulses are again supplied to integrating circuit 85.

The system continues to scan the area RSVW in the fashion described until the Y-scan voltage increases to the value necessary to trigger comparator 42. When this happens bistable circuit 35 changes to the RESET condition and the detailed scan ceases.

As has been previously described, during the scanning of the storage tube target 11 signals representing the information stored on target 11 are fed out through amplifier 12. Whenever the magnitude of any one of these signals exceeds a predetermined value an output pulse is produced on conductor 60 by amplitude discriminator circuit 17. The threshold of discriminator 17 may be set manually by the operator. Two AND gates 78 and 79 are provided, each having one input connected to conductor 60. The other input of AND gate 78 is connected to conductor 62 being the output of Y-scan generator 77. The other input of AND gate 79 is connected to conductor 63 being the output of the X-scan generator 85. When an output pulse is produced by the amplitude discriminator 17 AND gates 78 and 79 are opened to supply on output conductors 64 and 65 a representation of the exact coordinates of the signal which triggered discriminator 17.

Thus there has been described a system for reading out data stored in a designated part of an information store and establishing the exact coordinates of signals located during this detailed readout. Obvious variants in the described embodiments of my apparatus which fall within the scope of the appended claims are considered to be part of this invention. Thus it will be clear to those skilled in the art that integrating circuits 77 and 85 may be replaced by diode staircase generators. The manual controls of the voltage sources which set the level at which comparators 41 to 44 trigger may be separate or combined in one "joystick" control. It may be desirable to supply the output pulses from comparators 41 to 44 inclusive to display tube 13 so that the corners of the area of detailed scan are marked by bright areas on the display. It may also be desirable to utilize the pulse emitted from comparator 44 at the end of the detailed scan to reset the X-scan and Y-scan generators rather than using the start readout pulse for this purpose. It may also be desirable to utilise the clock pulse generator 30, and scan generating circuits 21, 22 in FIG. 1, and 77, 85 in FIG. 2, to provide the necessary scan voltages during the normal scan period when selective readout is not required, rather than supplying externally generated scanning voltages through terminals 14.

I claim:
1. An information storage system comprising, an information store having data addresses specified by a first and a second coordinate and having a first address input corresponding to said first coordinate and a second address input corresponding to said second coordinate,
a first scanning circuit having an output connected to said first address input and having an input responsive to pulses to provide incremental scanning of said addresses along said first coordinate,
a second scanning circuit having an output connected to said second address input and having an input responsive to pulses to provide incremental scanning of said addresses along said second coordinate,
a source of pulses,
a first gating means selectively connecting said pulse source to said first and second scanning circuit having a first gating condition passing pulses to said first scanning circuit and a second gating condition passing pulses to said second scanning circuit,
a memory circuit for storing the value of the output of said second scanning circuit,
second gating means selectively connecting said second scanning circuit to said memory circuit,
a comparator circuit having inputs connected to the outputs of said first and second scanning circuits respectively to sense the occurrence of address inputs corresponding to predetermined ones of said address coordinates defining an area of interest,
said comparator circuit having a first output connected to said first gating means to switch said first gating means from said first to said second gating condition on the occurrence of a predetermined address coordinate,
said comparator circuit having a second output connected to said first gating means to interrupt the supply of pulses to said first and second scanning circuits on the occurrence of a predetermined address coordinate,
said comparator circuit having a third output connected to said second gating means to store a value of the output of said second scanning circuit corresponding to one of said predetermined address coordinates,
said comparator circuit having a fourth output connected to said second gating means to set the output of said second scanning circuit to a value stored in said memory circuit.

2. An information storage system as claimed in claim 1 in which said information store produces an output signal representing data stored at the address defined by said address inputs and further comprising,
output gating means having inputs connected to said first and second scanning circuits,
signal sensing means responsive to a predetermined characteristic of said output signal to enable said output gating means to produce coordinate signals representing the coordinates of such output signals.

3. An information storage system comprising,
a cathode ray tube having an electron beam and means for deflecting said electron beam in a first and a second different direction,
a first scanning circuit having an output connected to said deflecting means and having an input responsive to pulses to provide incremental scanning of said electron beam along said first direction,
a second scanning circuit having an output connected to said deflecting means and having an input responsive to pulses to provide incremental scanning of said electron beam along said second direction,
a source of pulses,
a first gating means selectively connecting said pulse source to said first and second scanning circuit having a first gating condition passing pulses to said first scanning circuit and a second gating condition passing pulses to said second scanning circuit,
a memory circuit for storing the value of the output of said second scanning circuit, second gating means selectively connecting said second scanning circuit to said memory circuit, a comparator circuit having inputs connected to the outputs of said first and second scanning circuits respectively to sense the occurrence of predetermined electron beam deflections defining an area of interest, said comparator circuit having a first output connected to said first gating means to switch said first gating means from said first to said second gating condition on the occurrence of a predetermined deflection, said comparator circuit having a second output connected to said first gating means to interrupt the supply of pulses to said first and second scanning circuits on the occurrence of a predetermined deflection, said comparator circuit having a third output connected to said second gating means to store a value of the output of said second scanning circuit corresponding to one of said predetermined deflections, said comparator circuit having a fourth output connected to said second gating means to set the output of said second scanning circuit to a value stored in said memory circuit.

4. An information storage system as claimed in claim 3 in which said cathode ray tube contains an information storage target and means producing output signals representative of stored data, and further comprising,
output gating means having inputs connected to said first and second scanning circuits,
signal sensing means responsive to the amplitude of said output signal to enable said output gating means to produce coordinate signals representing the coordinates of such output signals measured with respect to said first and second directions.

5. An information storage system as claimed in claim 3 in which,
said first scanning circuit comprises a first digital counter connected to a first digital to analog converter so that the voltage at the output of said converter represents the number present in said counter,
said second scanning circuit comprises a second digital counter connected to a second digital to analog converter so that the voltage at the output of said second converter represents the number present in said second counter,
said memory circuit comprises a digital store,
said second gating means comprises a first multiple AND gate responsive to said third comparator output to have an enabled condition replicating the number present in said second counter in said digital store and a second multiple AND gate responsive to said fourth comparator output to have an enabled condition replicating the number present in said digital store in said second counter.

6. An information storage system as claimed in claim 3 in which,
said first scanning circuit comprises a first integrating circuit,
said second scanning circuit comprises a second integrating circuit,
said memory circuit comprises a third integrating circuit,
said second gating means comprises a first voltage setting means responsive to said third comparator output to have an enabled condition replicating the voltage present in said second integrating circuit in said third integrating circuit and a second voltage setting means responsive to said fourth comparator output to have an enabled condition replicating the voltage present in said third integrating circuit in said second integrating circuit.

7. An information storage system as claimed in claim 3 in which, said comparator circuit comprises a first, a second, a third and a fourth voltage comparator each having an adjustable triggering level,
said first and second comparators being connected to the output of said first scanning circuit,
said third and fourth comparators being connected to the output of said second scanning circuit,
said first comparator being connected to said first gating means to connect the source of pulses to said second scanning circuit at a first predetermined deflection in said first direction,
said second comparator being connected to said first gating means to disconnect the source of pulses from said first and second scanning circuits at a second predetermined deflection in said first direction,
said third comparator being connected to said second gating means to transfer information from said second scanning means to said memory circuit at a first predetermined deflection in said second direction,
said fourth comparator being connected to said second gating means to transfer information from said memory circuit to said second scanning means at a second predetermined deflection in said second direction,
said fourth comparator being further connected to said first scanning means to increment said first scanning means output when said electron beam achieves said second predetermined deflection in said second direction.

8. An information storage system comprising,
a cathode ray storage tube having an information storage target, an electron beam and means for deflecting said electron beam,
a first and a second digital to analog converter connected to said deflecting means to control deflection of the electron beam in first and second different directions,
a first and a second binary counter connected to said first and second digital to analog converters respectively so that the voltage at the output of each converter represents the number stored in the respective counter,
a source of repetitive pulse signals,
first gating means selectively connecting said source of pulse signals to said first and second binary counters,
a binary store,
a first multiple AND gate connecting said second binary counter to said binary store,
a second multiple AND gate connecting said binary store to said second binary counter,
a first, a second, a third and a fourth voltage comparator each having an adjustable triggering level,
said first and second comparators being connected to the output of said first digital to analog converter,
said third and fourth comparators being connected to the output of said second digital to analog converter,
said first comparator being connected to said first gating means to connect the source of pulse signals to said second binary counter at a first predetermined deflection in said first direction causing said first comparator to trigger,
said second comparator being connected to said first gating means to disconnect the source of pulses from said first and second scanning circuits at a second predetermined deflection in said first direction causing said second comparator to trigger,
said third comparator being connected to said first multiple AND gate to replicate the number present in said second binary counter in said binary store at a third predetermined deflection in said second direction causing said third comparator to trigger,
said fourth comparator being connected to said second multiple AND gate to replicate the number present in said binary store in said second binary counter at a fourth predetermined deflection in said second direction causing said fourth comparator to trigger,
said fourth comparator being further connected to said first binary counter to increment the number in said counter by one when said fourth comparator triggers,
said first, second, third and fourth predetermined deflections defining an area of detailed scan for said electron beam.

References Cited

UNITED STATES PATENTS

| | | | |
|---|---|---|---|
| 2,830,285 | 4/1958 | Davis et al. | 340—174 |
| 2,897,399 | 7/1959 | Garwin et al. | 315—10 |
| 2,997,693 | 8/1961 | Deerhake et al. | 340—173 |

ROBERT C. BAILEY, *Primary Examiner.*

R. B. ZACHE, *Assistant Examiner.*